3,264,193
PROCESS FOR CONVERTING AMYLACEOUS
MATERIALS TO DEXTROSE
Earl R. Kooi, La Grange, Robert Ladd Bruner, Hinsdale, and Timothy H. Newkirk, Westchester, Ill., assignors to Corn Products Company, New York, N.Y., a corporation of Delaware
Filed Dec. 17, 1963, Ser. No. 331,276
7 Claims. (Cl. 195—31)

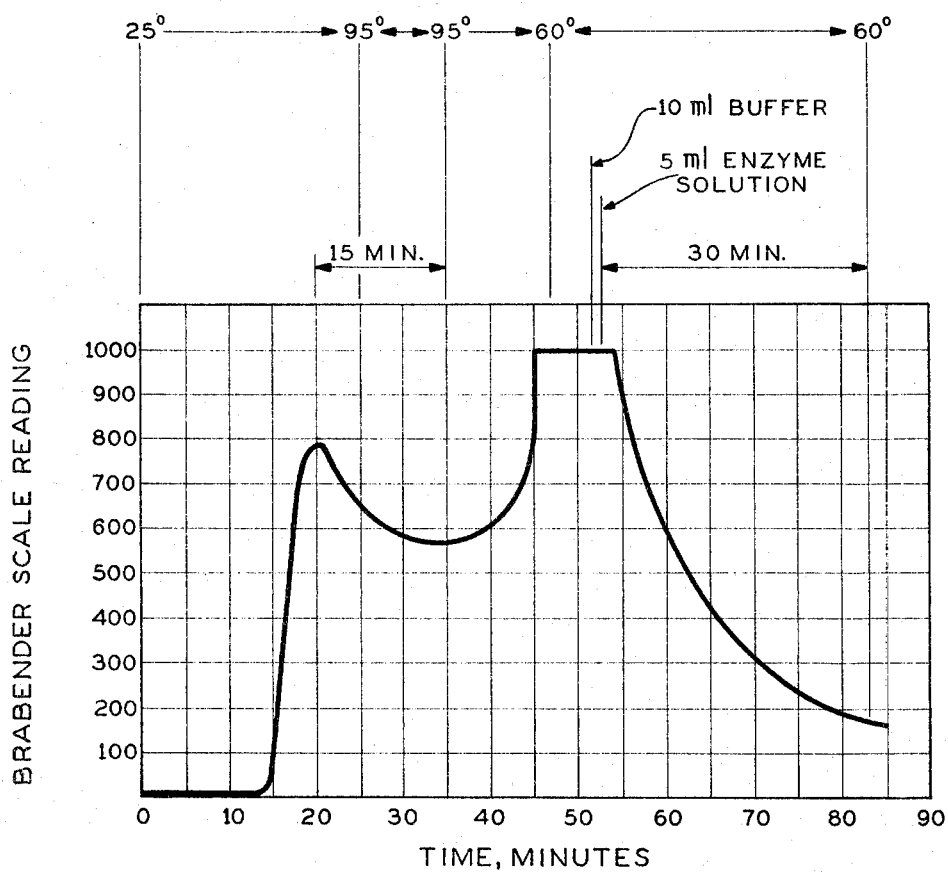

This invention relates to an improved method for enzymatically hydrolzing starch to high yields of dextrose and to the enzyme preparations used to obtain these high yields in an economic and efficient manner.

Processes for conversion of starch to substantial yields of dextrose are well known. All former processes have certain specific disadvantages which are due either to the processing steps or to the agents used to catalyze the hydrolysis of the starch.

Starch may be hydrolyzed to dextrose by acid catalysts. In normal industrial operation, for example as described in U.S. Patents 1,508,569 and 2,203,325, starch is converted at about 20% dry substance, and the maximum extent of conversion results in a composition of 90–91 D.E., 85–87% dextrose, dry basis, and the hydrolyzate contains substantial amounts of ash, color, and dextrose decompositon products.

Starch may also be converted to dextrose by a process in which a partial acid hydrolysis is followed by enzyme hydrolysis. In such a process it is possible to convert the starch at 30% dry substance or more, but the yields of dextrose are still limited and the hydrolyzate contains substantial amounts of inorganic materials resulting from the acid used in the preliminary hydrolysis. The following references show values which have been obtained:

|  | D.E. Value After Acid Conversion | D.E. Value After Enzyme Conversion | Dextrose Content After Enzyme Conversion |
|---|---|---|---|
| U.S. 2,305,168 | 48 | 88 | 81 |
| U.S. 2,531,999 | 25 | 92 | 90 |
| U.S. 2,893,921 | 42 | 87 | 84 |
| U.S. 3,042,584 | 10–15 | 91–93 | 89–90 |
|  | 16 | 95–96 | 92–94 |

Processes are also known in which starch is first enzymatically thinned and then enzymatically saccharified to dextrose. In such cases, it has been the practice to use an enzyme preparation derived from a bacterial or cereal source for thinning the starch, and an enzyme preparation from a fungal source for converting the thinned starch to dextrose. Following are results as described in the prior art:

|  | Starch Concn., percent d.s. | Source of Thinning Enzyme | pH Value During Thinning | Source of Saccharifying Enzyme | pH Value During Saccharification | D.E. Value of Hydrolyzate | Dextrose Content of Hydrolyzate |
|---|---|---|---|---|---|---|---|
| U.S. 2,531,999 | 20 | Malt | 5.5 | Fungus | 5.0 |  |  |
|  | 20 | Bacterium | 6.5 | do | 5.0 | 98 | 95 |
| U.S. 3,039,936 | 20 | B. Subtilis | 7.0 | Rhizopus | 4.8 | 98–99 |  |

Thus in prior art processes, not only is it necessary to use enzyme preparations from separate sources to accomplish the separate steps of thinning and saccharification, but substantial adjustments of pH values are required, thus adding to the content of inorganic materials in the hydrolyzates. These inorganic materials inhibit crystallization of dextrose, and are undesirable contaminants where the total hydrolyzate is used in liquid form or after solidification.

An object of the present invention is to provide an improved method for thinning the gelatinized starch. Another object is to enzymatically thin the starch at a pH value lower than was heretofore considered possible. Still a further object is to thin and saccharify the starch in a manner which does not require addition of acid after the thinning step. An additional object is to thin and saccharify the starch which enzyme preparations derived from organisms of a single genus of fungi.

These objects are accomplished by the use of temperature-stable, acid-resistant starch-thinning enzyme preparations derived from members of the *Aspergillus niger* group of the Aspergillus genus, and further by the use of enzyme preparations derived from the same group of organisms to saccharify the starch to high yields of dextrose.

We have discovered that members of the *Aspergillus niger* group, properly cultivated, elaborate an enzyme system which is extremely effective in thinning starch at temperatures above the gelatinization temperature of the starch, and which has maximum activity in a pH range which is also suitable for glucamylase action. Thus the entire thinning and saccharification may be carried out at a relatively constant pH, avoiding the necessity for several adjustments in acidity.

Suitable enzyme preparations containing the desired type of starch-thinning activity are derived from members of the *Aspergillus niger* group. This group of organisms is described in chapter 17 of Thom and Raper, "A Manual of the Aspergilli," The Williams and Wilkins Company, Baltimore (1945). Suitable specific cultures are *Aspergillus niger* ATCC 13,496, ATCC 13,497, NRRL 326, NRRL 330, NRRL 337, and NRRL 679, and *Aspergillus phoenicis* ATCC 13,156 and ATCC 13,157. The desired type of enzyme activity may be produced by submerged, aerobic growth of the organism on a medium composed of 10–15% ground corn and 1–2% Corn Steep Liquor. An initial pH value in the range of 5–7 is satisfactory. Other carbohydrate and protein sources may be substituted for the corn and Corn Steep Liquor, the choices being well known to those skilled in the art.

In general, it is essential to the production of the desired type of starch-thinning enzyme that the final pH of the culture liquor be less than about 4.5. This decrease in pH value normally occurs due to the production of acidic material by the culture. Following the completion of the fermentation, the culture liquor may be freed of transglucosidase content by treatment with a clay mineral in accordance with the teachings of U.S. Patent 3,042,584. The culture filtrate may be used directly, or the enzyme activity may be concentrated in known manner, such as by evaporation, dialysis, or by precipitation with salts or solvents.

This type of enzyme preparation, in contrast to those previously used in the thinning of starch as a preliminary step in the enzymatic conversion of starch to dextrose, operates efficiently under the combined conditions of relatively low pH and relatively high temperature. In contrast to the usual bacterial and fungal enzyme preparations, these improved enzyme preparations are more effective in thinning of the starch pastes when the thinning reaction is carried out at pH 3.5, 60° C., then when the thinning reaction is carried out at pH 5.0, 40° C. Enzyme preparations previously used, on the other hand, are more effective when the thinning reaction is carried out at pH 5.0, 40° C. than when the thinning reaction is carried out at pH 3.5, 60° C.

To demonstrate these differences, a 10% suspension of corn starch was placed in a Brabender Amylograph. The slurry was heated to 95° C. to gelatinize the starch, then cooled to either 60° C. or 40° C. To the cooled starch was added 15 ml. of 1.0 molar acetate buffer, and 5 ml. of enzyme solution. After 30 minutes at the prescribed temperature, the starch slurry was adjusted to 50° C. Results for an *Aspergillus niger* enzyme preparation, compared with *Bacillus subtilis* and *Aspergillus oryzae* enzyme preparations, are shown in Table I. The enzyme preparations derived from *Bacillus subtilis* and *Aspergillus oryzae* showed substantially greater activity in the thinning of starch at pH 5.0, 40° C. than at pH 3.5, 60° C., whereas the *Aspergillus niger* enzyme preparation showed substantially greater thinning activity at pH 3.5, 60° C. than at pH 5.0, 40° C.

TABLE I

| Source of Enzyme Preparation | *Aspergillus niger* | | *Bacillus subtilis* | | *Aspergillus oryzae* | |
|---|---|---|---|---|---|---|
| Temperature, ° C. | 40 | 60 | 40 | 60 | 40 | 60 |
| pH | 5.0 | 3.5 | 5.0 | 3.5 | 5.0 | 3.5 |
| Dosage | 5.0 | 1.0 | 1.0 | 1.0 | 1.0 | 1.0 |
| Viscosity: a | | | | | | |
| 5 minutes | >1,000 | 720 | 930 | >1,000 | 1,000 | 900 |
| 10 minutes | 940 | 480 | 670 | >1,000 | 860 | 870 |
| 15 minutes | 700 | 350 | 515 | >1,000 | 680 | 855 |
| 20 minutes | 530 | 260 | 415 | >1,000 | 555 | 840 |
| 25 minutes | 410 | 205 | 345 | >1,000 | 460 | 840 |
| 30 minutes | 320 | 165 | 300 | >1,000 | 385 | 840 |
| Adjusted to 50° C. | 150 | 120 | 200 | >1,000 | 240 | >1,000 | a Brabender scale reading.

These improved enzyme preparations derived from members of the *Aspergillus niger* group may be used over a wide range of pH and temperature values, although their effectiveness is reduced at pH values above 6.0 and at temperatures above 80° C. Thinning of gelatinized starch slurries at 60° C. and 80° C. at various pH values is shown below:

| | Viscosity at 30 Minutes, Brabender Units | | | | | | | |
|---|---|---|---|---|---|---|---|---|
| pH Value | 2.5 | 3.0 | 3.5 | 4.0 | 4.3 | 4.7 | 5.0 | 6.0 |
| Thinning Temperature, ° C.: | | | | | | | | |
| 60 | 320 | 220 | 165 | 160 | 165 | 220 | 240 | 610 |
| 80 | | | 470 | 385 | 310 | 480 | 490 | 740 |

Since glucamylase-containing enzyme preparations, the preparation of which is described in U.S. Patents 2,893,921 and 3,012,944, have an optimal pH of about 3.5–4.5 for converting thinned starch to dextrose, the eminent suitability of the *Aspergillus niger* enzyme preparations described above for converting starch to dextrose with a minimum of pH adjustment is easily seen.

To thin the starch, it will generally be desirable to use an amount of the enzyme preparation in proportion to the starch at least equivalent to the amount which will effect the degree of thinning at pH 3.5, 60° C. as shown in column 2 of Table I. A graphic representation of the results is shown in the drawing. The procedure is described below:

Fifty grams of commercial corn starch (12% moisture) was diluted with water to 500 ml. in a volumetric flask. The 500 ml. of starch slurry was placed in the cup of a Model 318, Type A07 Brabender Amylograph. The slurry was then heated to 95° C. in about 25 minutes. Fifteen minutes after reaching peak viscosity, the slurry was rapidly cooled to 60° C. After about 5 minutes at 60° C., 10 ml. of 1.0 M, pH 3.5 acetate buffer was added, followed by 5 ml. of properly diluted enzyme solution. The slurry was held for 30 minutes after addition of the enzyme.

The procedures for enzyme thinning of starch are well known. Starch slurries may be gelatinized at high temperatures, then cooled to below 90° C. for enzyme thinning; a starch slurry with enzyme added may be heated to a point above the gelatinization point of the starch, or a starch slurry with enzyme added may be run continuously into a vessel held above the gelatinization temperature of the starch. The amount of enzyme preparation required to obtain adequate thinning of the starch will depend on the activity of the enzyme preparation, the time, the temperature, and the starch concentration.

Because the enzyme preparations described above operate effectively in the pH range of 3 to 5, there is no necessity for acidification prior to saccharification, although minor adjustments may be desirable. The thinned starch may be converted to dextrose by means of enzyme preparations derived from members of the *Aspergillus niger* group. Such preparations and effective conditions for their use are described in U.S. Patents 2,893,921; 3,012,944, and 3,042,584. For maximum yields of dextrose, it is preferable that the glucamylase preparations have a low content of transglucosidase activity. Means of obtaining *Aspergillus niger* enzyme preparations low in transglucosidase activity are described in U.S. Patents 3,012,944; 3,042,584; 3,067,108; and 3,108,928.

Glucamylase activity is determined as follows: The substrate is a 15–18 D.E. spray-dried acid hydrolyzate of corn starch. This material is dissolved in water and diluted to 4.0 grams of dry substance per 100 ml. of solution. Exactly 50 ml. of the solution is pipetted into a 100-ml. volumetric flask. To the flask is added 5.0 ml. of pH 4.3, 1.0 molar sodium acetate-acetic acid buffer. The flask is placed in a water bath at 60° C., and after 10 minutes, the proper amount of enzyme preparation is added. At exactly 120 minutes after addition of the enzyme preparation, the solution is adjusted to a phenolphthalein end point with one normal sodium hydroxide. The solution is then cooled to room temperature, and diluted to volume. A reducing sugar value, calculated as dextrose, is determined on the diluted sample and on a control with no enzyme preparation added. Glucamylase activity is calculated as follows:

$$A = \frac{S-B}{2 \times E}$$

where:

A = glucamylase activity, units per ml. or per gram of enzyme preparation.
S—reducing sugars in enzyme converted sample, grams per 100 ml.
B—reducing sugars in control, grams per 100 ml.
E = amount of enzyme preparation used, ml. or grams.

The reducing sugar concentration in the enzyme-converted sample should be not more than 1.0 gram per 100 ml.

The invention may be further illustrated by the examples which follow. They are for illustrative purposes only and are not to be construed as limiting our invention. All of the enzyme preparations used for thinning the starch were derived from members of the *Aspergillus niger* group of the Aspergillus genus. All of these enzyme preparations, when tested in accordance with the procedure used to obtain the data of Table I, were more effective in thinning starch at pH 3.5, 60° C., than at pH 5.0, 40° C. Amounts indicated are relative to that amount required to effect the degree of thinning shown in FIGURE 1 when tested at ph 3.5, 60° C. according to the procedure described.

*Example I*

To a slurry of corn starch at 18° Bé., pH 4.5 was added an enzyme preparation derived from submerged growth of *Aspergillus niger* ATCC 13,496 in a corn-Corn Steep Liquor medium. To effect thinning of a 10% starch paste at ph 3.5, 60° C. equivalent to that shown in the drawing required an enzyme preparation dosage equivalent to 2.8 ml. of culture filtrate per 100 grams of starch. The actual amount added to the 18° Baumé starch was equivalent to 6.7 ml. of culture filtrate per 100 grams of starch or 2.4 times the amount required to effect thinning of a 10% starch paste at pH 3.5, 60° C. equivalent to that shown in the drawing. The starch-enzyme slurry was run continuously into an agitated vessel maintained at 80° C. Addition time was 30 minutes. The slurry was held at 80° C. for an additional 60 minutes, and then was cooled to 60° C. Adjustment of the pH value was unnecessary. To the thinned starch was added an amount of an enzyme preparation derived from *Aspergillus niger* ATCC 13,496 equivalent to 15-glucamylase units per 100 grams of starch. Saacharification was continued for 72 hours. The amount of solids removed by filtration was 2.1% of the total dry substance present. The filtrate composition was 98.8 D.E., 97.8% dextrose, dry basis.

*Example II*

Example I was repeated using the same conditions except that the temperature during addition of the starch-enzyme slurry was 73° C., and the temperature for the additional 60 minutes was 80° C. The filtrate composition was 99.4 D.E., 98.4% dextrose, dry basis. The amount of solids removed by filtration was 2.0% by weight of the total dry substance present.

*Example III*

Example II was repeated substituting starches from various sources for the corn starch. Shown below are the results with the various starches.

| Starch Source | Solids Removed by Filtration, Percent | Composition of Filtered Hydrolyzate | |
|---|---|---|---|
| | | D.E. | Dextrose, Percent, d.b. |
| Yellow Corn | 1.9 | 99.1 | 98.1 |
| Tapioca | 0.8 | 99.9 | 99.6 |
| Waxy Milo | 1.1 | 98.2 | 96.9 |
| Regular Milo | 1.2 | 98.4 | 97.0 |
| Rice | 1.7 | 97.3 | 95.6 |
| Wheat | 2.7 | 93.3 | 97.1 |
| Irish Potato | 3.5 | 97.8 | 96.1 |
| White Sweet Potato | 3.8 | 98.1 | 96.7 |

*Example IV*

To an 18° Bé. corn starch slurry at pH 3.5 was added 2.3 times the amount of an *Aspergillus niger* enzyme preparation required to effect the degree of thinning of a 10% starch paste comparable to that shown in FIGURE 1. Over a period of 30 minutes, the starch-enzyme slurry was run into an agitated vessel held at 73° C. After holding at 73° C. for 2.5 hours, the temperature was increased to 80° C. After holding at 80° C. for 30 minutes, the thinned starch was then cooled to 60° C., and an *Aspergillus niger* glucamylase preparation equivalent in amount to 15 units of glucamylase per 100 grams of starch was added. After 98 hours saccharification, the liquor was filtered. The filtration residue was 2.2 grams of dry substance per 100 grams of starch. Analysis of the filtrate showed 98.7 D.E., 97.5% dextrose.

*Example V*

Example IV was repeated using various pH values during thinning and saccharification and various temperatures during thinning. Results are shown in Table II.

TABLE II

| Temperature During Thinning | | pH Value | | Loss on Filtration, percent | Composition of Filtered Hydrolyzate | |
|---|---|---|---|---|---|---|
| First Stage | Second Stage | During Thinning | During Saccharification | | D.E. | Dextrose, percent d.b. |
| 73 | 80 | 3.0 | 3.0 | 2.0 | 98.8 | 97.6 |
| 73 | 80 | 3.5 | 3.5 | 1.6 | 98.8 | 97.6 |
| 73 | 80 | 4.0 | 4.0 | 3.4 | 98.7 | 97.3 |
| 73 | 80 | 4.6 | 4.6 | 3.3 | 98.9 | 97.7 |
| 73 | 80 | 3.0 | 4.6 | 5.5 | 98.1 | 96.5 |
| 73 | 80 | 3.5 | 4.6 | 3.5 | 98.7 | 97.3 |
| 76 | ----- | 4.6 | 4.6 | 3.7 | 98.0 | 96.4 |
| 76 | 80 | 3.0 | 3.0 | 1.9 | 98.7 | 97.3 |
| 76 | 80 | 3.5 | 3.5 | 1.9 | 98.7 | 97.3 |
| 76 | 80 | 4.0 | 4.0 | 2.3 | 98.2 | 96.7 |
| 76 | 80 | 4.6 | 4.6 | 2.4 | 98.6 | 97.3 |
| 76 | 80 | 4.6 | 3.0 | 2.0 | 98.3 | 96.8 |
| 76 | 85 | 4.6 | 4.6 | 2.1 | 98.9 | 97.7 |
| 76 | 85 | 3.5 | 3.5 | 1.7 | 98.3 | 96.8 |

We claim:
1. A process for the conversion of starch to dextrose comprising thinning the starch at a pH in the range of about 3 to 5 with a fungal enzyme preparation and converting the thinned starch to dextrose at a pH in the range of about 3 to 5 with a fungal enzyme preparation.

2. A process for the conversion of starch to dextrose comprising thinning the starch with an enzyme preparation derived from the *Aspergillus niger* group of the Aspergillus genus and enzymatically converting the thinned starch to dextrose.

3. A process for the conversion of starch to dextrose comprising thinning the starch with an enzyme preparation derived from the *Aspergillus niger* group of the Aspergillus genus and converting the thinned starch to dextrose with a fungal enzyme preparation.

4. A process for the conversion of starch to dextrose comprising thinning the starch at a pH in the range of about 3 to 5 with an enzyme preparation derived from the *Aspergillus niger* group of the Aspergillus genus and enzymatically converting the thinned starch to dextrose at a pH in the range of about 3 to 5.

5. A process for the conversion of starch to dextrose comprising thinning the starch at a pH in the range of about 3 to 5 with an enzyme preparation derived from the *Aspergillus niger* group of the Aspergillus genus and converting the thinned starch to dextrose at a pH in the range of about 3 to 5 with a fungal enzyme preparation.

6. A process for the conversion of starch to dextrose comprising thinning the starch with an enzyme preparation derived from the *Aspergillus niger* group of the Aspergillus genus and converting the thinned starch to dextrose with an enzyme preparation derived from the *Aspergillus niger* group of the Aspergillus genus.

7. A process for the conversion of starch to dextrose comprising thinning the starch at a pH in the range of about 3 to 5 with an enzyme preparation derived from the *Aspergillus niger* group of the Aspergillus genus and converting the thinned starch to dextrose at a pH in the range of about 3 to 5 with an enzyme preparation derived from the *Aspergillus niger* group of the Aspergillus genus.

References Cited by the Examiner
UNITED STATES PATENTS
2,970,086  1/1961  Kerr _____ 195—66
3,042,584  7/1962  Kooi et al. _____ 195—31

References Cited by the Applicant
FOREIGN PATENTS
8,634  4/1951  Germany.

A. LOUIS MONACELL, *Primary Examiner.*

L. M. SHAPIRO, *Assistant Examiner.*